US011914409B2

(12) United States Patent
Zhu

(10) Patent No.: US 11,914,409 B2
(45) Date of Patent: Feb. 27, 2024

(54) INTEGRATED USER PROGRAMMABLE SLEW-RATE CONTROLLED SOFT-START FOR LDO

(71) Applicant: SILEGO TECHNOLOGY INC., Wilmington, DE (US)

(72) Inventor: Hua Zhu, San Jose, CA (US)

(73) Assignee: SILEGO TECHNOLOGY INC.

( * ) Notice: Subject to any disclaimer, the term of this patent is extended or adjusted under 35 U.S.C. 154(b) by 6 days.

(21) Appl. No.: 17/564,947

(22) Filed: Dec. 29, 2021

(65) Prior Publication Data

US 2023/0205245 A1 Jun. 29, 2023

(51) Int. Cl.
*G05F 1/575* (2006.01)
*G05F 1/46* (2006.01)

(52) U.S. Cl.
CPC .............. *G05F 1/575* (2013.01); *G05F 1/468* (2013.01)

(58) Field of Classification Search
CPC ................................ G05F 1/575; G05F 1/468
See application file for complete search history.

(56) References Cited

U.S. PATENT DOCUMENTS 6,046,577 A * 4/2000 Rincon-Mora ......... G05F 1/575 323/280
2003/0102851 A1* 6/2003 Stanescu ................ G05F 1/575 323/280
2003/0178976 A1* 9/2003 Xi .......................... G05F 1/575 323/273
2006/0197513 A1* 9/2006 Tang ...................... G05F 1/575 323/273
2013/0257401 A1* 10/2013 Fort ........................ G05F 1/575 323/280
2014/0159682 A1* 6/2014 Pan ......................... G05F 1/10 323/280

(Continued)

FOREIGN PATENT DOCUMENTS

CN 101122804 A * 2/2008
CN 102707754 A * 10/2012

(Continued)

OTHER PUBLICATIONS

Texas Instruments, Data Sheet, "TPS74401 3.0-A, Ultra-LDO with Programmable Soft-Start", TPS74401, SBVS066Q—Dec. 2005—Revised Apr. 2015, 39 pages.

(Continued)

*Primary Examiner* — Sisay G Tiku
(74) *Attorney, Agent, or Firm* — Haynes and Boone, LLP

(57) ABSTRACT

Disclosed is an integrated user programmable slew-rate controlled soft-start for a low-dropout regulator that includes a current steering stage and an integrator stage. The current steering stage may also be denoted as an error amplifier. A Miller compensation capacitor couples between an input node to the integrator stage and an output node for an output voltage of LDO. During a power up period of the LDO, the current steering stage generates an input current that charges the Miller compensation capacitor. This controlled charging of the Miller compensation capacitor controls the slew rate of the output voltage as it rises to its regulated value at a completion of the power up period.

15 Claims, 6 Drawing Sheets

(56) References Cited

U.S. PATENT DOCUMENTS

| | | | | |
|---|---|---|---|---|
| 2014/0266100 | A1* | 9/2014 | Cavallini | G05F 1/468 323/273 |
| 2019/0258282 | A1* | 8/2019 | Magod Ramakrishna | G05F 1/575 |
| 2019/0393697 | A1* | 12/2019 | Jordanger | H03K 17/0822 |
| 2020/0201373 | A1* | 6/2020 | Koay | G05F 1/59 |
| 2020/0278709 | A1* | 9/2020 | Azevedo | G05F 1/575 |
| 2021/0397207 | A1* | 12/2021 | Joo | G05F 1/575 |

FOREIGN PATENT DOCUMENTS

| | | | | |
|---|---|---|---|---|
| EP | 2778823 | A1 * | 9/2014 | G05F 1/468 |
| EP | 3933543 | A1 * | 1/2022 | |

OTHER PUBLICATIONS

Analog Devices, Data Sheet ADP7105, "20 V, 500 mA, Low Noise LDO Regulator with Soft Start", 28 pages.
Al-Shyoukh et al.; "A Current-Limiter-Based Soft-Start Scheme for Linear and Low-Dropout Voltage Regulators"; 978-1-4244-5309-2/10/$26.00 © 2010 IEEE; pp. 2738-2741.

* cited by examiner

INTEGRATED USER PROGRAMMABLE SLEW-RATE CONTROLLED SOFT-START FOR LDO

TECHNICAL FIELD

This application relates to a low-dropout regulator (LDO), and more particularly to a low-dropout regulator having a slew-rate controlled soft-start.

BACKGROUND

At the startup of a low-dropout regulator, the LDO output voltage begins to rise until it reaches the desired regulated output voltage level. The rate of increase of the output voltage is typically denoted as the LDO slew rate. In that regard, an electronic system may include multiple LDOs that are powered up according to a defined power sequence. Should the LDO power up too fast or too slow, the electronic device may enter a fault stage due to the violation of the power sequence for the corresponding LDO. The LDO slew rate is thus an important factor in the power sequencing of an electronic system.

To control the LDO slew rate, it is conventional for an LDO to couple to an external soft-start terminal or pin that in turn couples to a soft-start capacitor. A current source in the LDO charges the soft-start capacitor. The charging of the soft-start capacitor then controls the LDO slew rate. A circuit designer may then configure the slew rates of the various LDOs in an electronic system by selecting the appropriate capacitance for the corresponding soft-start capacitors and/or by adjusting the amount of charging current provided by the current source. But the necessity of an integrated circuit terminal and a soft-start capacitor for each LDO raises manufacturing costs and complexity and increases the system area size.

SUMMARY

A low-dropout regulator is provided that includes: a transconductor configured to drive an output voltage at an output node of the low-dropout regulator; a capacitor coupled to the output node of the low-dropout regulator; and an error amplifier configured to generate an input current during a start-up of the low-dropout regulator to charge the capacitor to control a slew rate of the output voltage.

A method of controlling the slew rate of an output voltage of a low-dropout regulator during a power up period of the low-dropout regulator is provided that includes the acts of: steering a tail current through a first transistor in a transistor pair during the power up period; mirroring the tail current to form an input current to a capacitor coupled to an output node the low-dropout regulator; and charging the capacitor with the input current to control the slew rate of the output voltage as the output voltage rises from zero volts at an initiation of the power up period to a regulated value at a completion of the power up period.

In addition, a low-dropout regulator is provided that includes: an transconductance amplifier in series with a boost amplifier having a Miller capacitor coupled between an input node of the boost amplifier and an output node of the transconductance amplifier, wherein the Miller capacitor comprises a parallel arrangement of a metal-insulator-metal capacitor, a MOSFET capacitor, and a varactor; and an error amplifier configured to drive the input node of the boost amplifier with an error voltage responsive to the difference between a feedback voltage and a reference voltage.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

Embodiments of the present disclosure and their advantages are best understood by referring to the detailed description that follows. It should be appreciated that like reference numerals are used to identify like elements illustrated in one or more of the figures.

DETAILED DESCRIPTION

To reduce manufacturing costs and complexity and also reduce the integrated circuit package size, an integrated circuit is provided with an LDO that uses its Miller compensation capacitor as the soft-start capacitor. This is quite advantageous as the integrated circuit then needs no extra terminals for the soft-start capacitor, which reduces the integrated circuit pin count and results in reduced printed circuit board routing complexity. In addition, the system footprint is reduced.

Figure 1:
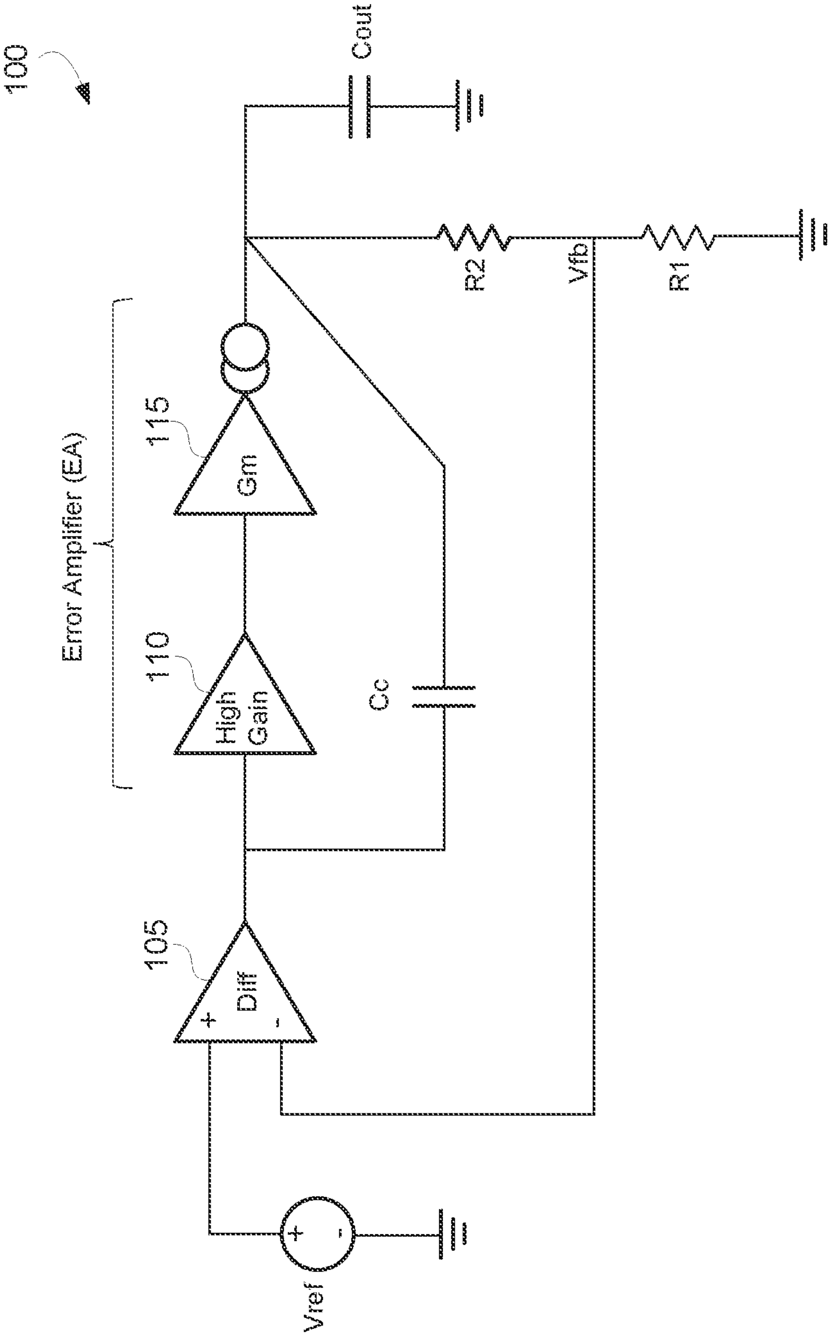
FIG. 1 illustrates an example soft-start LDO in accordance with an aspect of the disclosure.

An example LDO 100 with this advantageous soft start is shown in FIG. 1. LDO 100 includes an error amplifier 105 and an integrator stage 120. Integrator stage 120 is formed by a high gain amplifier 110 (which also may be denoted as a boost amplifier) in series with a transconductance amplifier 115. Transconductance amplifier 115 may also be denoted herein as a transconductor. Depending upon the transconductance of transconductor 115, an output current charges an output capacitor Cout with an LDO output voltage. During normal operation following the soft start, the LDO output voltage is regulated by LDO 100 to equal a desired output voltage. To maintain this regulation, error amplifier 105 receives a feedback voltage Vfb derived from the LDO output voltage. For example, a voltage divider formed by a serial pair of resistors R1 and R2 may divide the LDO output voltage into the feedback voltage Vfb. Error amplifier 105 generates an error voltage based upon a difference between the feedback voltage Vfb and a reference voltage Vref from a reference voltage source (e.g., a bandgap reference circuit). Integrator stage 120 amplifies and transconducts the error voltage into the LDO output current to charge the output capacitor Cout with the LDO output voltage.

During normal operation, a Miller compensation capacitor Cc that couples between an input node to the integrator stage 120 and an output node for the integrator stage 120 compensates the LDO to increase stability while the LDO output voltage is regulated to the desired level. As will be explained further herein, LDO 100 uses the Miller compensation capacitor Cc as a soft-start capacitor during startup. A charging rate of the Miller compensation capacitor Cc during a power up period of LDO 100 controls the slew rate for the LDO output voltage.

To control the charging rate of the Miller compensation capacitor, error amplifier 105 functions as a current source during the power up period to bias the Miller compensation capacitor Cc with an input current Iin. To generate the input current Iin, error amplifier 105 includes a pair of transistors (discussed further below). The feedback voltage Vfb biases a gate of one transistor in the transistor pair whereas the reference voltage Vref biases a gate of a remaining second transistor in the transistor pair. Depending upon the difference between Vfb and Vref, the transistor pair steers a tail current to form a steered tail current that is mirrored to become the input current. Due to this current steering behavior, error amplifier 105 may also be denoted herein as a current steering stage. The input current then charges the Miller compensation capacitor Cc in integrator stage 120. Note that integrator stage 120 may be denoted as an integrator because the voltage across the Miller compensation capacitor Cc is proportional to an integral of the input current Iin during the power up period.

The tail current for the current steering stage of LDO 100 may be generated by any suitable current source. The following discussion will be directed to embodiments in which the current source is a current digital-to-analog converter (IDAC) without loss of generality. A user may thus configure a digital input code that is converted by the IDAC to control the LDO slew rate.

Figure 2:
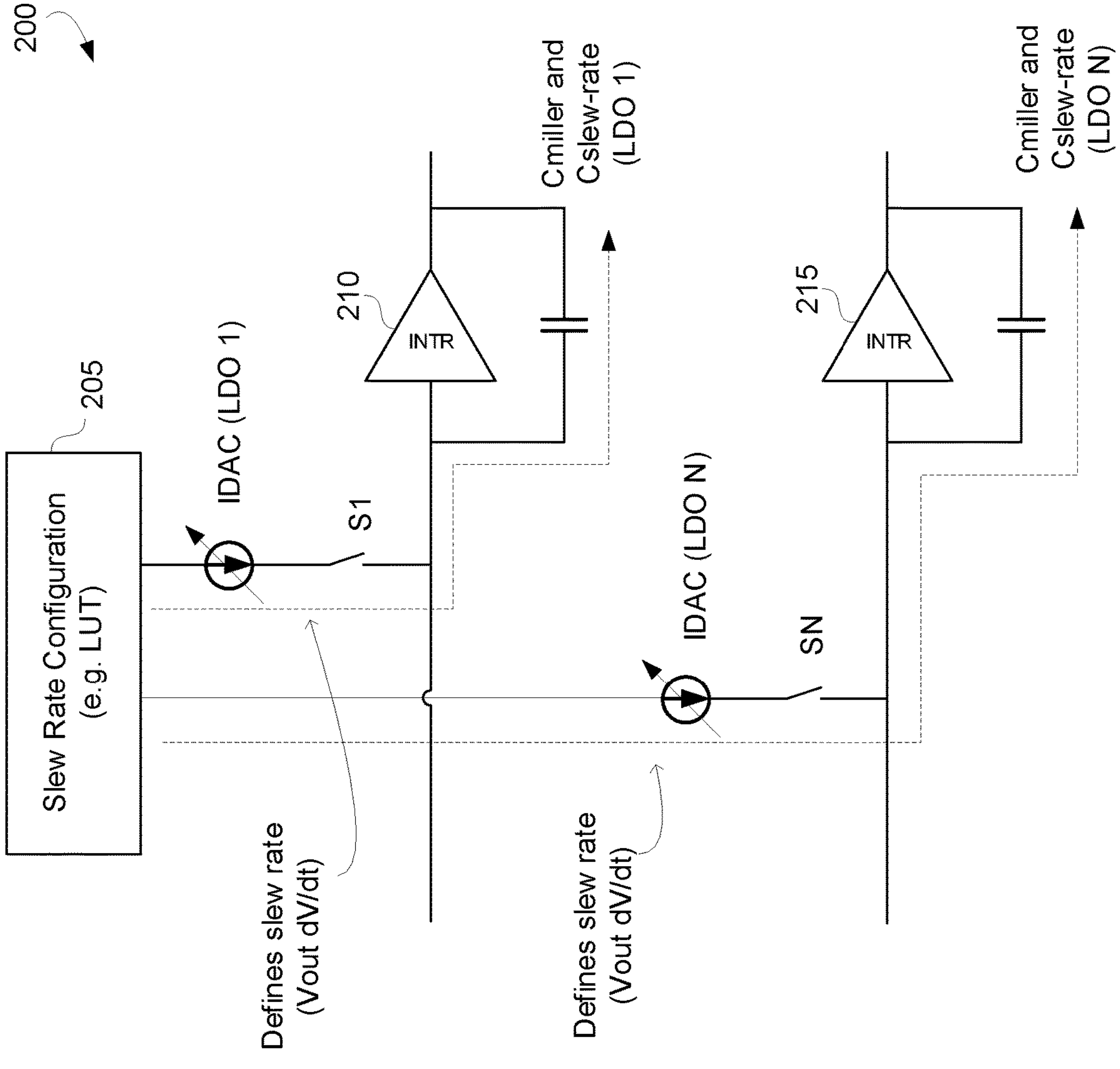
FIG. 2 illustrates an electronic system including a plurality of soft-start LDOs in accordance with an aspect of the disclosure.

An example electric system 200 that includes a plurality of N LDOs is shown in FIG. 2, where N is a plural positive integer. Although there are N LDOs ranging from a first LDO (LDO 1) to an Nth LDO (LDO N), only the first and Nth LDOs are shown in system 200 for illustration clarity. The current steering stage of each LDO is represented by an IDAC that couples to an input node of the corresponding integration stage 210 by a switch. For example, the current steering stage in LDO 1 is formed by an IDAC (LDO 1) and a switch Si. Similarly, the current steering stage in LDO N is formed by an IDAC (LDO N) and a switch SN. Each switch is shown for conceptual purposes to control the actuation of the corresponding current steering stage. It will thus be appreciated that switches Si through SN need not be included in an actual implementation of the respective current steering stages. A slew rate configuration circuit such as a lookup table (LUT) 205 functions as the input code source to each IDAC. Depending upon the input code, each IDAC generates a tail current that is mirrored to form the input current Iin to each corresponding integration stage 210. The input code from LUT 205 thus defines a slew rate (the time rate of change dV/dt of the LDO output voltage) for the corresponding LDO. System 200 thus has an accurate slew rate control for each of its N LDOs without requiring any dedicated terminals or external components.

Figure 3:
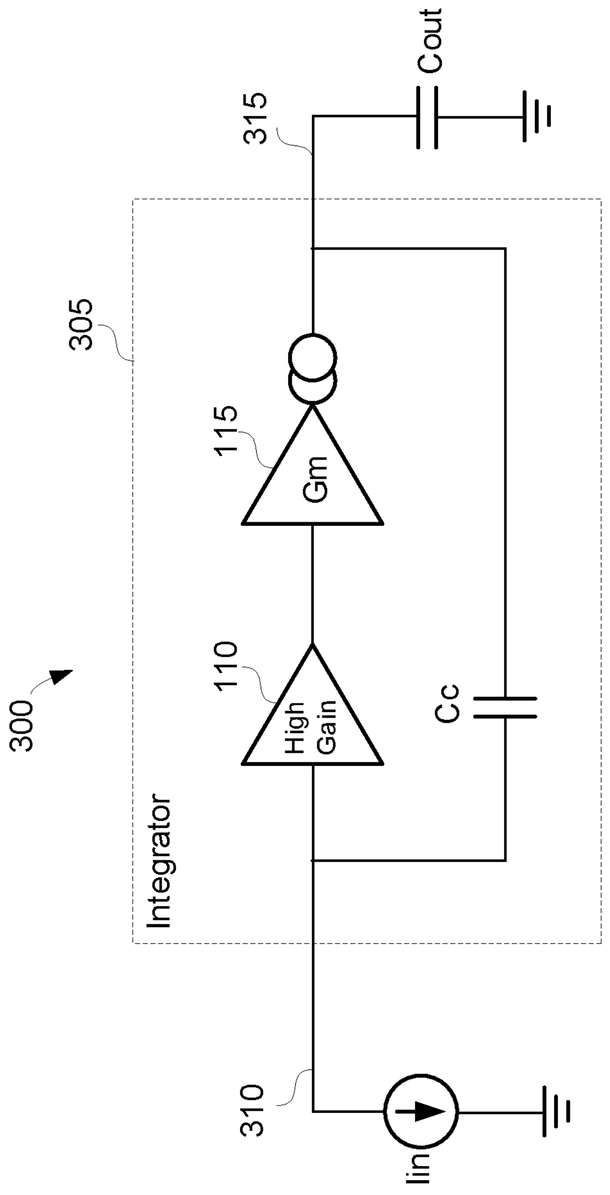
FIG. 3 illustrates an example soft-start LDO in which the error amplifier is represented by a current source in accordance with an aspect of the disclosure.

An example LDO 300 is shown in FIG. 3 in which the current steering stage is represented by a current source that sources the input current Iin from an input node 310 to the Miller compensation capacitor Cc in an integrator stage 305. Integrator stage 305 contains boost amplifier 110 and transconductor 115 as discussed with regard to LDO 100. Transconductor 115 drives an output current into an output node 315 to develop the LDO output voltage across an output capacitor Cout.

Figure 4:
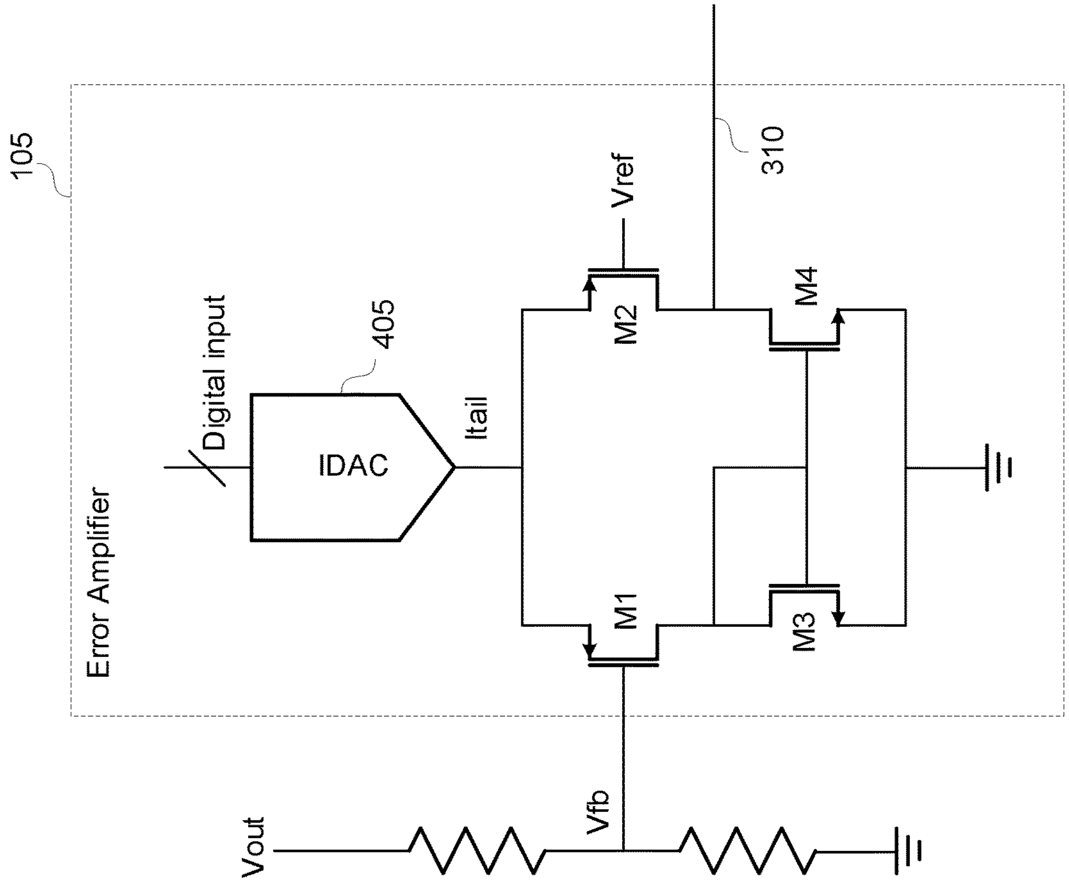
FIG. 4 is a circuit diagram of an example error amplifier in accordance with an aspect of the disclosure.

An example current steering stage 105 is shown in FIG. 4. In this embodiment, the transistor pair is a pair of p-type metal-oxide-semiconductor (PMOS) transistors M1 and M2. An IDAC 405 drives a tail current Itail into a node at the sources of transistors M1 and M2. A digital code that is converted by IDAC 405 controls the magnitude of the tail current Itail. A voltage divider divides the LDO output voltage Vout to form the feedback voltage Vfb that is used in current steering stage 105 to bias a gate of transistor M1. Similarly, the reference voltage Vref biases a gate of transistor M2. During an initial portion of a power up period of an LDO with current steering stage 105, the LDO output voltage is zero volts. Transistor M1 will thus conduct substantially all of the tail current Itail during this initial portion of the power up period. In contrast, transistor M2 is off and thus not conducting during this initial portion.

A drain of transistor M1 couples to a gate and drain of a diode-connected n-type metal-oxide-semiconductor (NMOS) transistor M3. Transistor M3 has its gate coupled to a gate of an NMOS transistor M4 that in turn has its drain coupled to the drain of transistor M2. The drains of transistor M2 and M4 couple to input node 310 of the corresponding integrator stage (not illustrated). The sources of transistors M3 and M4 couple to ground. Transistors M3 and M4 thus form a current mirror such that during the initial portion of the power up period, transistor M4 mirrors the tail current Itail to conduct the input current Iin from input node 310 to ground (through the channel of transistor M4). The digital code converted by IDAC 405 thus indirectly controls the magnitude of the input current Iin depending upon the relative sizes of transistors M1 through M4. The proportionality between the tail current Itail and the input current Iin is assumed to be unity in the following discussion without loss of generality.

Figure 5:
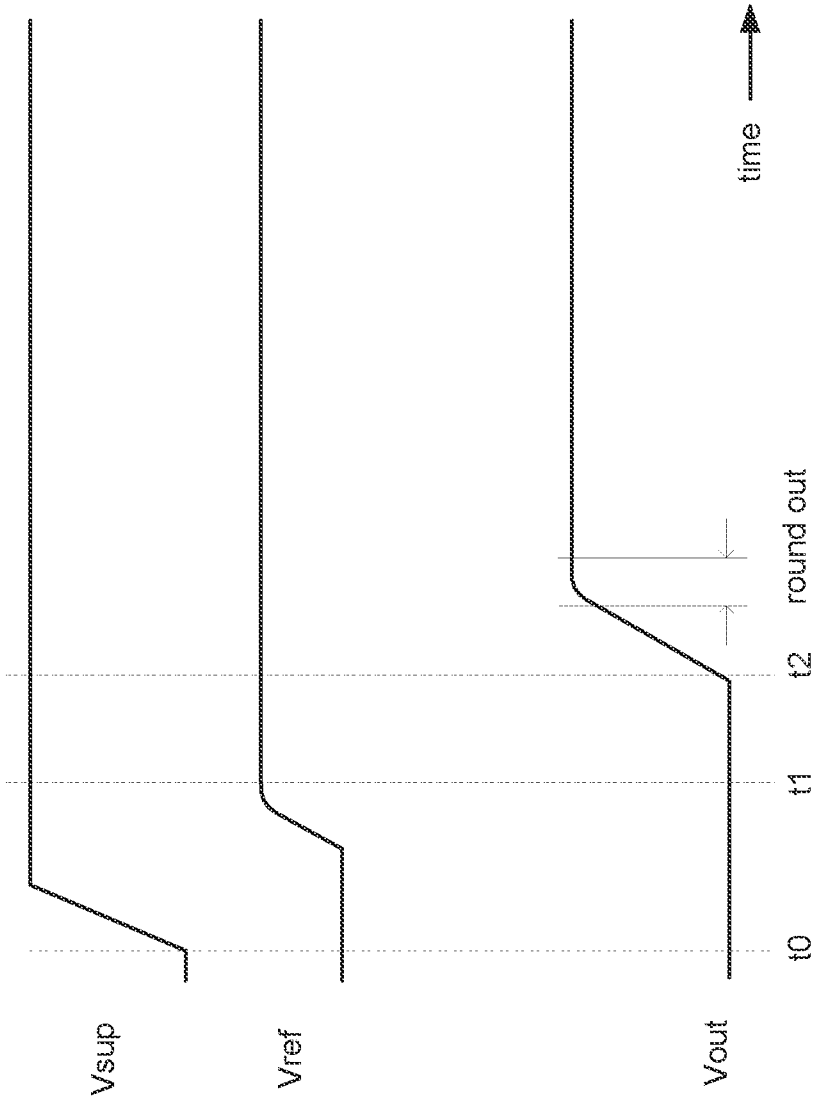
FIG. 5 illustrates some operating waveforms during start-up of a soft-start LDO in accordance with an aspect of the disclosure.

Some example waveforms for the LDO output voltage Vout and the reference voltage Vref in an LDO with current steering stage 105 during the power up period of the LDO are shown in FIG. 5. Power-up begins at a time to. Both the output voltage Vout and the reference voltage Vref are zero volts initially. As the LDO begins to power-up, the reference voltage Vref is driven to the desired value. With the reference voltage Vref developed, the integrator stage 120 is enabled at a time t1. At time t1, a bias circuit (not illustrated) biases the input node 310 to a suitable startup voltage such as 0.8 volts. Although the integrator stage 120 was enabled, the output voltage Vout remains at approximately zero volts at time t1. At a time t2, IDAC 405 is enabled so that current steering stage 105 becomes operational. The delay from time t0 to time t2 is thus the initial portion of the power up period discussed above. Since the output voltage Vout is still substantially zero volts at time t2, the feedback voltage Vfb is also zero volts. The tail current Itail will thus conduct through transistors M1 and M3 and is mirrored by transistor M4 as the input current Iin. The slew rate of the output voltage Vout beginning at time t2 will thus equal Iin/Cc, where Cc is the capacitance of the Miller compensation capacitor Cc. The output voltage Vout increases at this constant slew rate until the feedback voltage Vfb rises to almost equal the reference voltage Vref. At this point, transistor M2 begins to switch on so that the input current Iin decreases from its Itail level to zero amps, which causes the output voltage to smoothly round out from the constant slew rate to the desired regulated value during normal operation beginning at a completion of the power up period.

Note that at time t1, the voltage from the input node 310 across the Miller compensation capacitor Cc to the output node 315 for the output voltage Vout is approximately V (or whatever suitable value is desired to bias the integrator stage 120 during its power up). Should the regulated value of the output voltage Vout be 4 V, this voltage across the Miller compensation capacitor Cc will then decrease to −3.2 V during normal operation.

Given this range of positive and negative voltages across the Miller compensation capacitor Cc, the Miller compensation capacitor may be implemented as a metal-insulator-metal (MiM) capacitor. Such a MiM capacitor may be integrated with the integrated circuit including the LDO. But MiM capacitors may demand a relatively large semiconductor die area.

Figure 6:
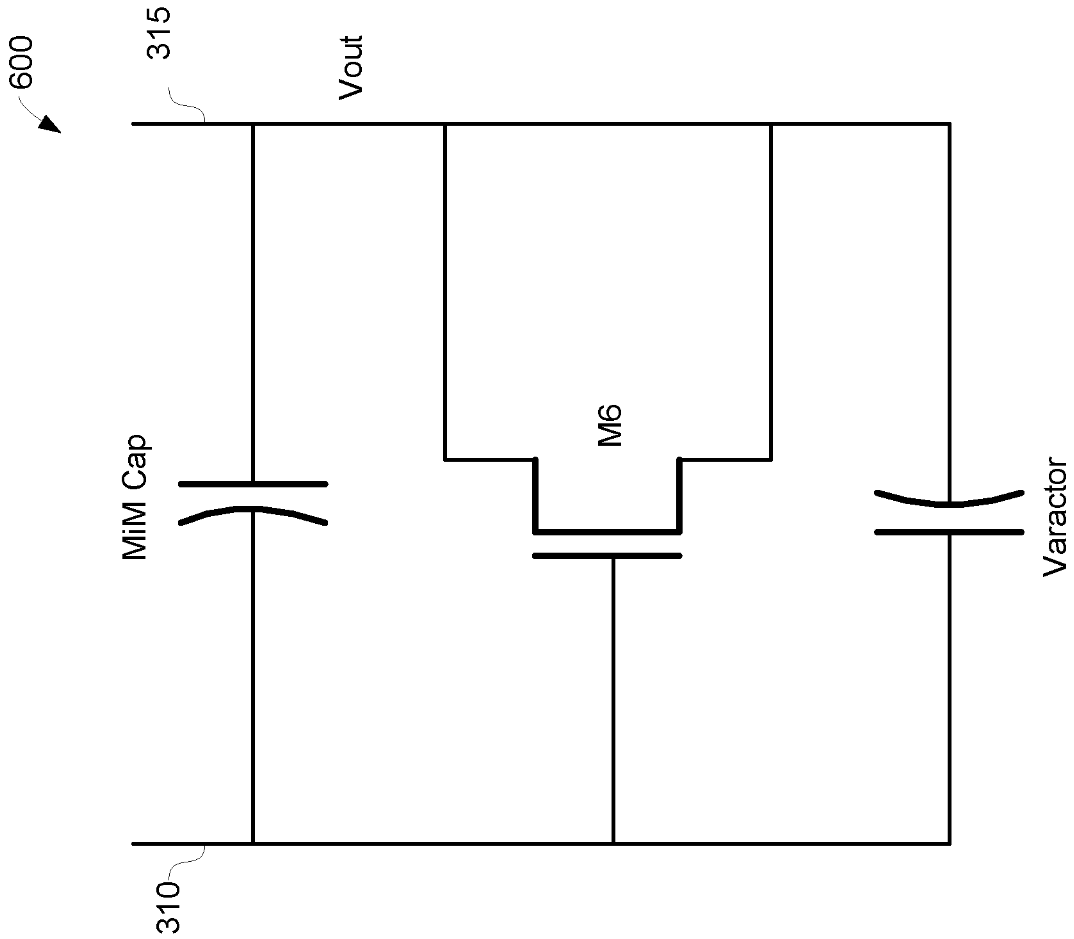
FIG. 6 illustrates an example Miller compensation capacitor implementation for a soft-start LDO in accordance with an aspect of the disclosure.

To save die area, a Miller compensation capacitor 600 may be implemented as shown in FIG. 6. A MiM capacitor couples in parallel between the input node 310 and output node 315 with a metal oxide semiconductor field effect transistor (MOSFET) capacitor M6. The MiM capacitor also couples in parallel with a varactor. The source and drain of MOSFET capacitor M6 couple to the output node 315 whereas its gate couples to the input node 310. As the voltage between input node 310 and output node 315 changes from its initial value (e.g., 0.8 V) to its regulated value (e.g., −3.2 V) during power up, it can be shown that MOSFET capacitor M6 switches operation from the depletion region to the accumulation region. Conversely, the varactor switches operation from the accumulation region to the depletion region at the same time. The non-linear effects on their respective capacitances thus substantially cancel out such that the Miller compensation capacitance (which is also the soft-start capacitance) is substantially constant. Due to the capacitance provided by the MOSFET capacitor M6 and the varactor, the MiM capacitor may be relatively small, which reduces its die area.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed:

1. A low-dropout regulator, comprising: a transconductor configured to drive an output voltage at an output node of the low-dropout regulator;
- a capacitor coupled to the output node of the low-dropout regulator;
- an error amplifier configured to generate an input current during a start-up of the low-dropout regulator to charge the capacitor,
- wherein the error amplifier includes a current digital-to-analog converter configured to generate a tail current during the start-up of the low-dropout regulator, and
- a slew rate configuration circuit configured to generate a digital code to the current digital-to-analog converter, and wherein the current digital-to-analog converter is configured to convert the digital code to form the tail current to control a slew of the output voltage.

2. The low-dropout regulator of claim 1, wherein the error amplifier further includes a pair of transistors configured to steer the tail current responsive to a difference between a feedback voltage and a reference voltage.

3. The low-dropout regulator of claim 2, wherein a first transistor in the pair of transistors has a gate coupled to a node for the feedback voltage and a second transistor in the pair of transistors has a gate coupled to a node for the reference voltage.

4. The low-dropout regulator of claim 2, wherein the error amplifier further includes a current mirror configured to mirror the tail current to form the input current.

5. The low-dropout regulator of claim 2, wherein the low-dropout regulator further comprises a voltage divider configured to divide the output voltage to form the feedback voltage.

6. The low-dropout regulator of claim 1, wherein the slew rate configuration circuit comprises a lookup table.

7. The low-dropout regulator of claim 1, wherein the capacitor is configured to function as a Miller compensation capacitor during a normal operation of the low-dropout regulator.

8. The low-dropout regulator of claim 7, further comprising:
- a boost amplifier in series with the transconductor, wherein the Miller compensation capacitor is coupled between an input node to the boost amplifier and the output node of the transconductor.

9. A method of controlling a slew rate of an output voltage of a low-dropout regulator during a power up period of the low-dropout regulator, comprising:
- converting a digital code in a current digital-to-analog converter to form the tail current;
- steering the tail current through a first transistor in a transistor pair of an error amplifier during the power up period; mirroring the tail current to form an input current to a capacitor coupled to an output node of the low-dropout regulator; and charging the capacitor with the input current to control the slew rate of the output voltage as the output voltage rises from zero volts at an initiation of the power up period to a regulated value at a completion of the power up period.

10. The method of claim 9, wherein steering the tail current through the first transistor in the transistor pair of the error amplifier is responsive to driving a gate of the first transistor with a feedback voltage derived from the output voltage and to driving a gate of a second transistor in the transistor pair with a reference voltage.

11. The method of claim 9, further comprising:
- compensating the low-dropout regulator using the capacitor during a normal operation of the low-dropout regulator.

12. A low-dropout regulator, comprising:
- a transconductor having a Miller compensation capacitor coupled to an output node of the transconductor, wherein the Miller compensation capacitor comprises a parallel arrangement of a metal-insulator-metal capacitor, a MOSFET capacitor, and a varactor; and
- an error amplifier configured to drive an input node of the Miller compensation capacitor with an error voltage responsive to a difference between a feedback voltage and a reference voltage.

13. The low-dropout regulator of claim 12, wherein the error amplifier comprises:
- a current source configured to generate a tail current;
- a pair of transistors configured to steer the tail current responsive to the difference between the feedback voltage and the reference voltage to form a steered tail current; and a current mirror configured to mirror the steered tail current into an input current to charge the Miller compensation capacitor to control a slew rate of an output voltage on the output node during a power up period of the low-dropout regulator.

14. The low-dropout regulator of claim 13, wherein the current source comprises a current digital-to-analog converter.

15. The low-dropout regulator of claim 13, further comprising:

a boost amplifier coupled between the error amplifier and the transconductor, wherein the Miller compensation capacitor is coupled between an input node to the boost amplifier and the output node of the transconductor.

* * * * *